United States Patent [19]

Chung

[11] Patent Number: 5,756,968
[45] Date of Patent: May 26, 1998

[54] ELECTRIC COOKER WITH TWO COOKING CHAMBERS

[76] Inventor: Chin-Fu Chung, No. 898, Min-Sheng St., Kuei-Jen Hsiang, Tainan Hsien, Taiwan

[21] Appl. No.: 597,266

[22] Filed: Feb. 6, 1996

[51] Int. Cl.⁶ .................................................. F27D 11/00
[52] U.S. Cl. .................................................. 219/428
[58] Field of Search ............................. 219/428, 429, 219/431, 438, 440, 496; 99/293, 316, 331, 448

[56] References Cited

U.S. PATENT DOCUMENTS

| | | | |
|---|---|---|---|
| 4,307,287 | 12/1981 | Weiss | 219/442 |
| 4,591,698 | 5/1986 | Chang | 219/400 |
| 4,686,896 | 8/1987 | Gordon | 99/482 |
| 4,728,778 | 3/1988 | Choi et al. | 219/428 |
| 5,429,039 | 7/1995 | Chang | 99/231 |

*Primary Examiner*—Matthew V. Nguyen
*Attorney, Agent, or Firm*—Varndell Legal Group

[57] ABSTRACT

An electric cooker which includes a cooker unit controlled to heat an electric heating coil therein and defining a top chamber above the electric heating coil and a bottom chamber below the electric heating coil, a cooking container mounted in the top chamber of the cooker unit, a sliding steam tray assembly mounted in the bottom chamber of the cooker unit, and a cover hinged to the cooker unit and covered on the top chamber and having a pressure regulator controlled to let excessive pressure be exhausted out of the cover or to guide steam from the top chamber to the bottom chamber to steam food in the steam tray assembly.

8 Claims, 11 Drawing Sheets

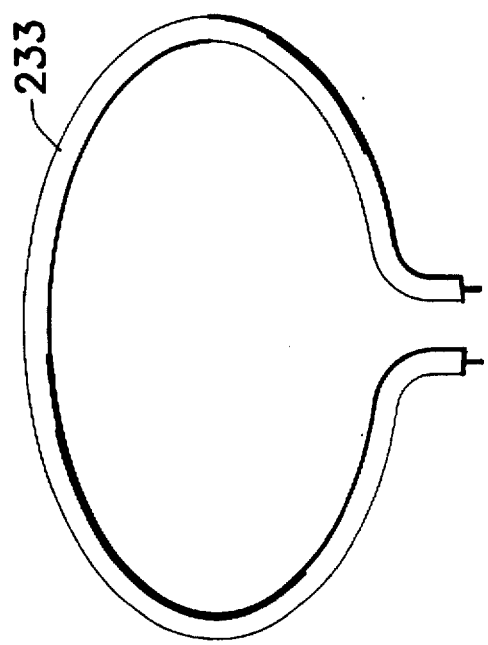

5,756,968

ELECTRIC COOKER WITH TWO COOKING CHAMBERS

BACKGROUND OF THE INVENTION

The present invention relates to electric cookers, and relates more particularly to such an electric cooker which has two vertically spaced cooking chambers for cooking food efficiently.

Regular electric cookers commonly use an electric heating coil to heat food in the cooking container above. Because the electric heating coil is disposed below the cooking container, much energy is wasted.

SUMMARY OF THE INVENTION

The present invention has been accomplished to provide an electric cooker which eliminates the aforesaid drawback. According to the preferred embodiment of the present invention, the electric cooker is comprised of three parts, namely, the cooker unit, the cover, and the steam tray assembly. The cooker unit has a top chamber, which holds a cooking container, a bottom space, which holds the steam tray assembly, and an electric heating coil between the top chamber and the bottom space. The cover is hinged to the cooker unit and covered on the top chamber, having a pressure regulator controlled to let excessive pressure be exhausted out of the cover or to guide steam from the top chamber to the bottom chamber to steam food in the steam tray assembly.

BRIEF DESCRIPTION OF THE DRAWINGS

FIG. 10 is an elevational view of the electric heating coil according to the present invention.

DETAILED DESCRIPTION OF THE PREFERRED EMBODIMENT

Referring to the annexed drawings in detail, an electric cooker in accordance with the present invention is generally comprised of a cover 1, a cooker unit 2, and a steam tray assembly 3.

Figure 7:
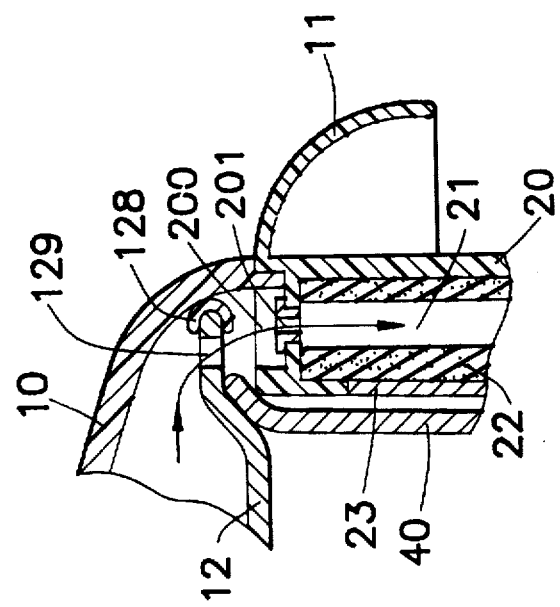
FIG. 7 is a partial view in section in an enlarged scale of the cover and the cooker unit, showing the steam passage route to the steam tubes.

Referring to FIGS. from 1 to 5, the cover 1 comprises an outer cover shell 10, and an inner cover plate 12 fastened to the inside of the cover shell 10. The inner cover plate 12 comprises a vent pipe 122 at the center, a packing strip 128 around the periphery to prevent direction contact between the outer cover shell 10 and the inner cover plate 12 (see also FIG. 7), and a plurality of air vents 129 near the border. The outer cover shell 10 comprises a pressure regulator 100 connected to the vent pipe 122 of the inner cover plate 12. The pressure regulator 100 comprises a top exhaust port 120 disposed outside the outer cover shell 10, a bottom exhaust port 123 disposed inside the inner cover plate 12, a valve 124 forced downwards by a spring 121 between the top exhaust port 120 and the bottom exhaust port 123 (see also FIG. 7).

Referring to FIGS. from 1 to 5 again, the cooker unit 2 comprises a casing 20, a hollow heat-conductive inner wall 23 disposed inside the casing 20, an electric heating coil 233 horizontally disposed inside the casing 20 (see also FIG. 10) below the heat conductive inner wall 23, a cooking container 40 mounted within the hollow heat-conductive inner wall 23, a heat-insulative lining 22 covered around the hollow heat-conductive inner wall 23 inside the casing 20, a plurality of steam tubes 21 mounted in between the heat-insulative lining 22 and the casing 20 (see FIG. 4), a top water groove 200 defined at the top around the border between the casing 20 and the hollow heat-conductive inner wall 23, a water filter 201 mounted within the top water groove 200 (see also FIG. 7), a water trough 202 at the back side (see FIG. 2), a heat-conductive cover lining 31 spaced below the electric heating coil 233 and defining a bottom space to hold the steam tray assembly 3 inside the casing 20, a cover lining control spring 232 pressed on the heat-conductive cover lining 31, a plurality of steam hoses 210 connected between the bottom ends of the steam tubes 21 and respective holes (not shown) in the heat-conductive cover lining 31, a horizontal track 330 horizontally disposed at the bottom and extending to the outside of the casing 20 for permitting the steam tray assembly 3 to be inserted into the inside of the space below the heat-conductive cover lining 31, and a switch box 5 on the outside of the casing 20 for operation control (see FIG. 2). Furthermore, a safety device which consists of a safety switch 230 and a control spring 231 is mounted inside the cooker unit 2 for controlling the operation of the electric heating coil 233.

Figure 1:
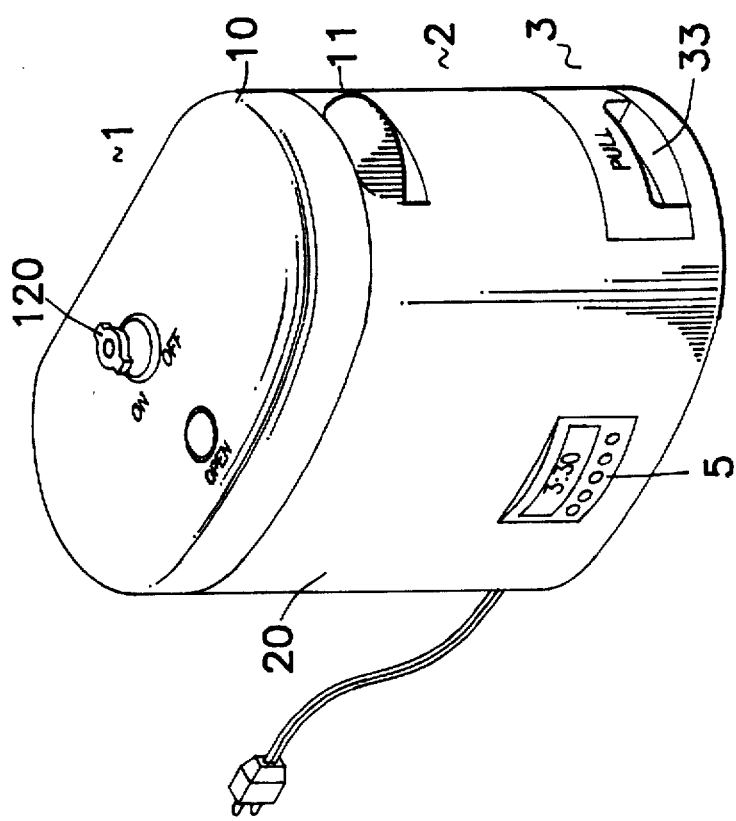
FIG. 1 is an elevational view of an electric cooker according to the present invention.
Figure 2:
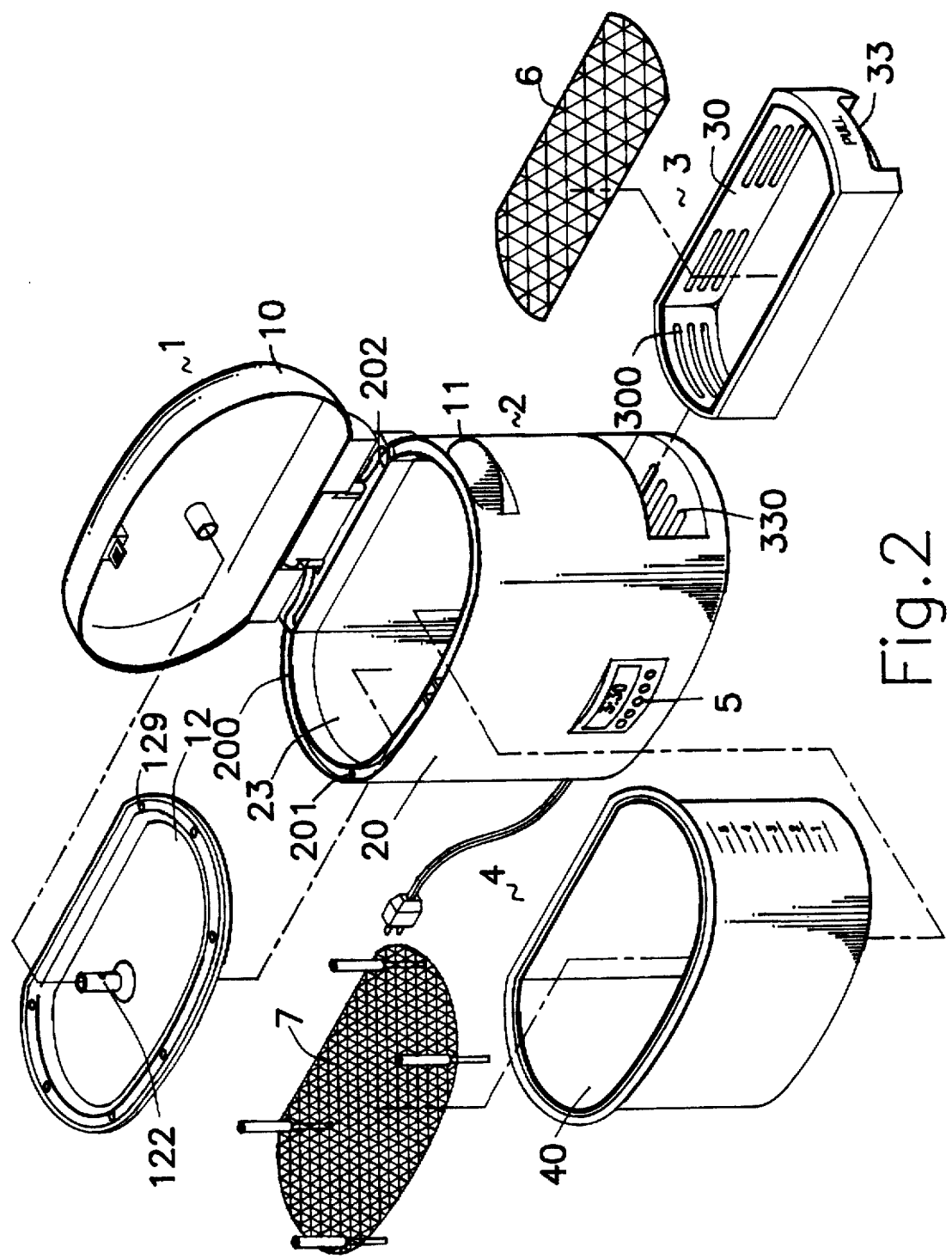
FIG. 2 is an exploded view of the electric cooker shown in FIG. 1.
Figure 3:
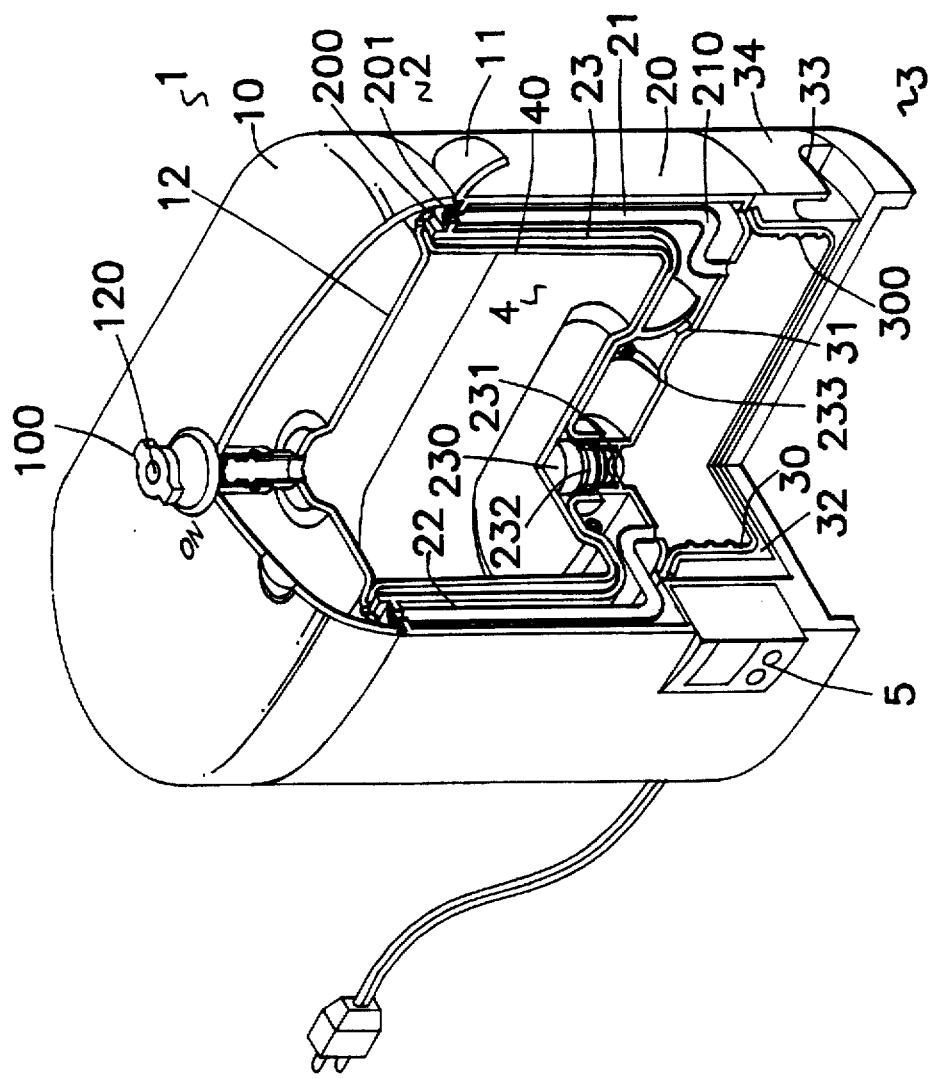
FIG. 3 is a cutaway of the electric cooker shown in FIG. 1.
Figure 4:
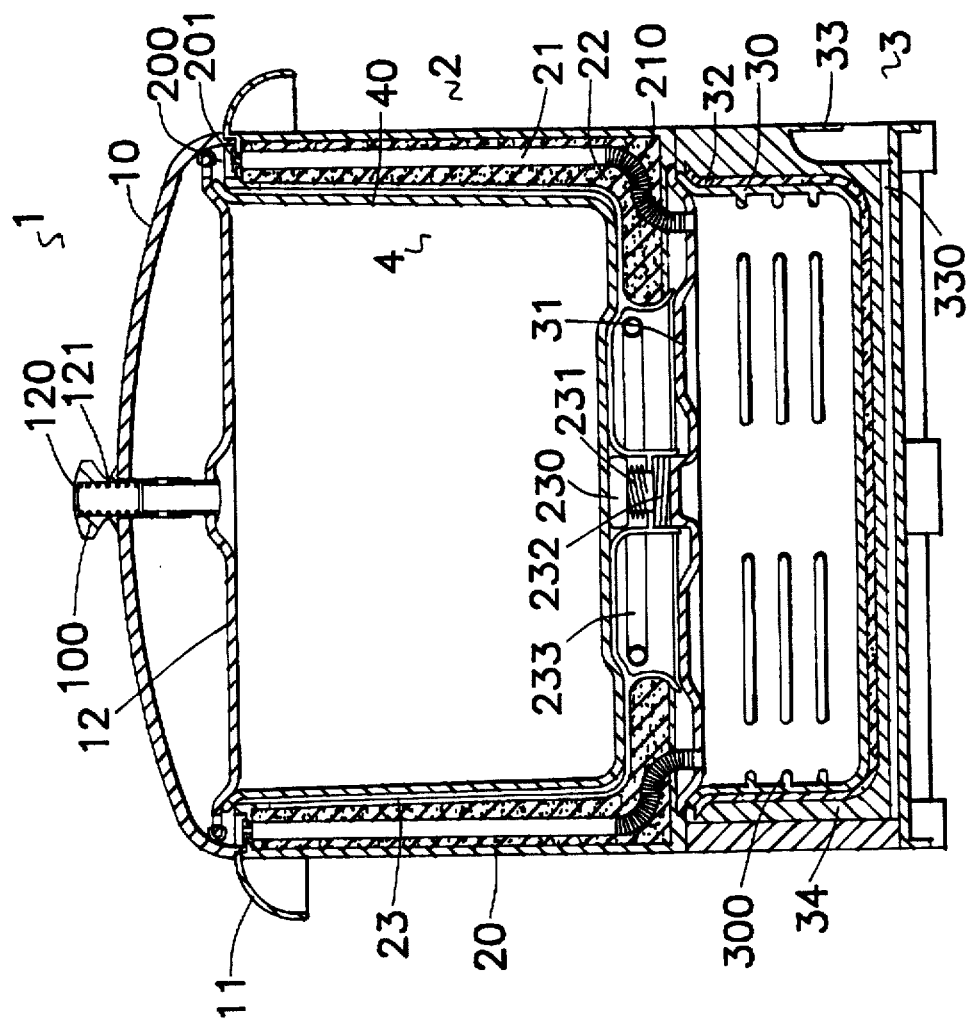
FIG. 4 is a front view in section of the electric cooker shown in FIG. 1.
Figure 5:
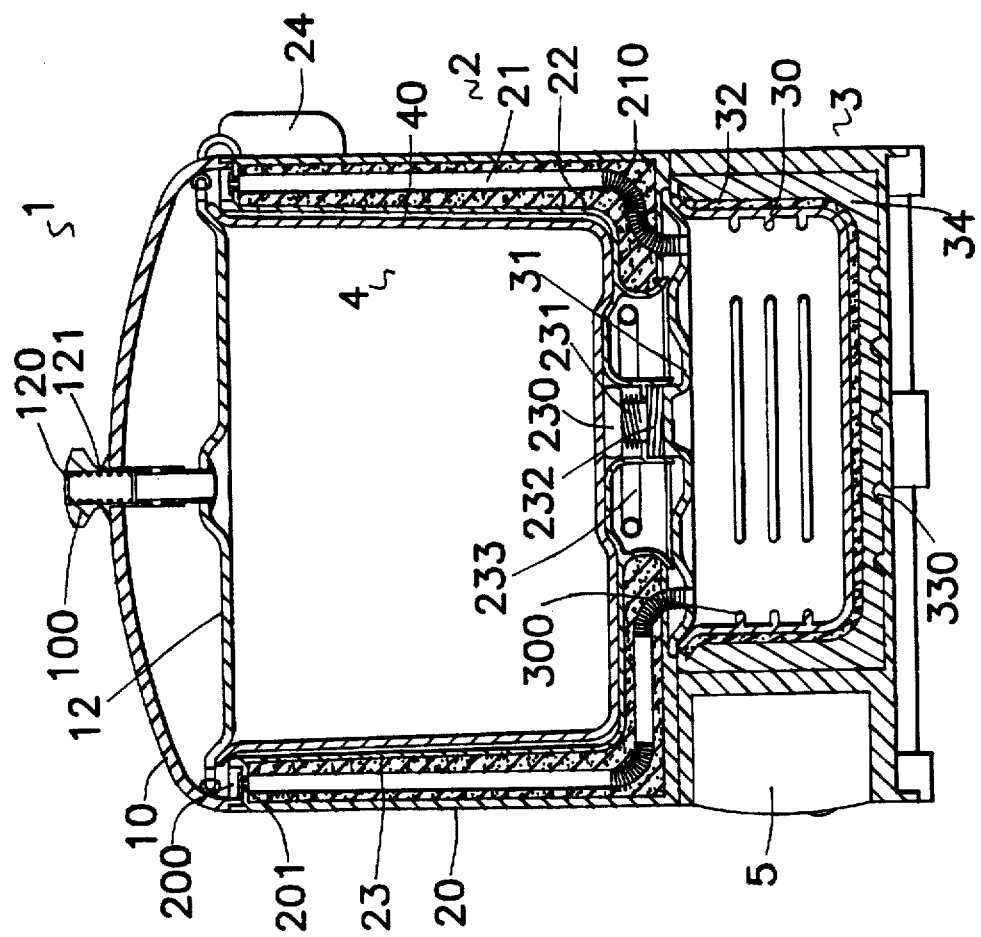
FIG. 5 is a side view in section of the electric cooker shown in FIG. 1.
Figure 6:
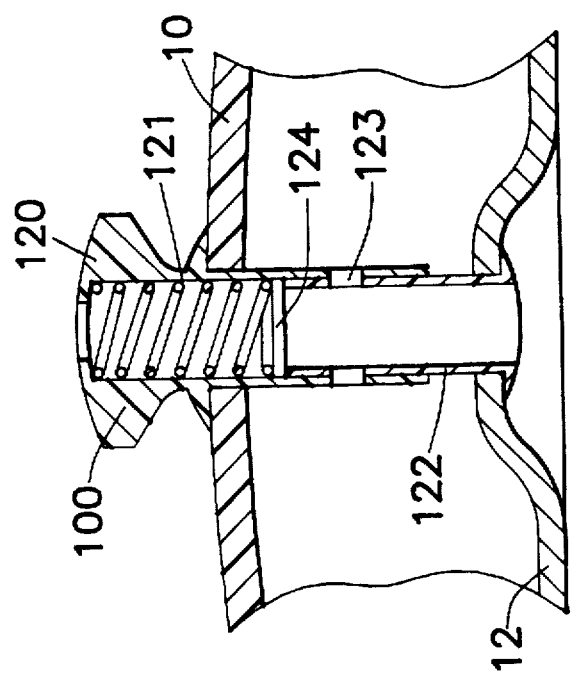
FIG. 6 is a sectional view in an enlarged scale of a part of the cover, showing the structure of the pressure regulator thereof.

Referring to FIGS. 2 and 4, the steam tray assembly 3 comprises a tray body 30 covered with a heat-insulative lining 32 and an outer shell 34, a hand-hold 33 made on the outer shell 34, and a meshed steam rack 6. The tray body 30 has a plurality of horizontal ribs 300 raised around the inside wall for holding the meshed steam rack 6.

Figure 8A:
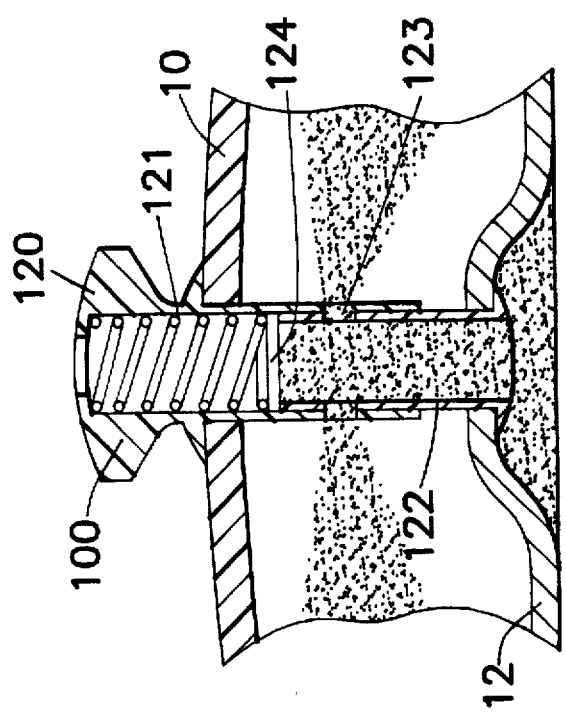
FIG. 8A is similar to FIG. 6 but showing steam released through the bottom exhaust port.
Figure 8B:
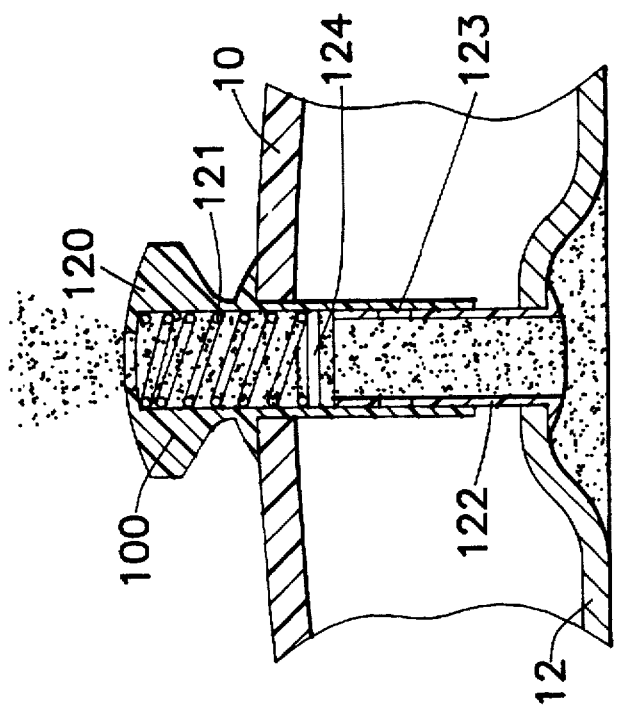
FIG. 8B is similar to FIG. 6 but showing steam released through the top exhaust port.
Figure 9A:
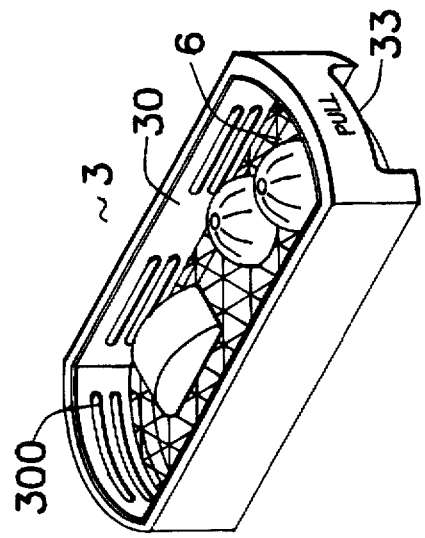
FIG. 9A shows one application example of the steam tray assembly according to the present invention.
Figure 9B:
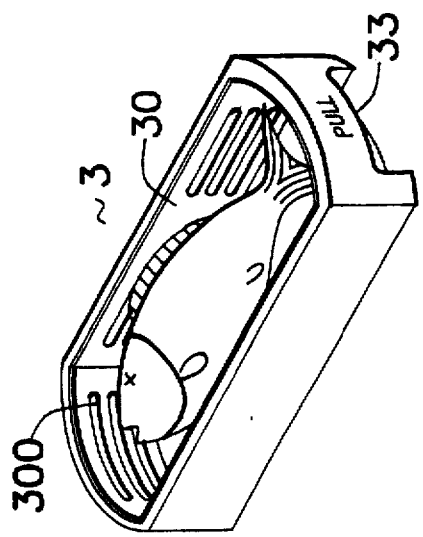
FIG. 9B shows another application example of the steam tray assembly according to the present invention.

Referring to FIGS. 8A, 83, 9A, and 9B, and FIGS. from 4 to 6 again, the pressure regulator 100 control the exhaust of steam through the top exhaust port 120 to the outside of the cooker, or through the bottom exhaust port 123 to the steam tray assembly 3. The cooking container 40 has an oval profile. This design relatively increases the space for the steam tray assembly 3. The top water groove 200 prevents condensed water from entering the cooking container 40. The water filter 201 prevents solid matter from passing to the steam tubes 21. The packing strip 128 closes the cooking container 40 tightly when the cover 1 is closed on the casing 20 of the cooker unit 2. The safety switch 230 is supported on the control spring 231 in the off position to cut off power supply from the electric heating coil 233. When the cooking container 40 is put to the inside of the hollow heat-conductive inner wall 23 of the cooker unit 2, the safety switch 230 is forced to switch on and to connect power supply to the electric heating coil 233. The heat-conductive cover lining 31 is forced downwards by the cover lining control spring 232. When the steam tray assembly 3 is inserted into the horizontal track 330 of the cooker unit 2, the heat-conductive cover lining 31 is forced upwards toward the electric heating coil 233. The heat conductive parts of the cooker are respectively covered with heat-insulative materials 22, 23 (the heat-insulative lining 22 is covered on the heat-conductive inner wall 23 and the electric heating coil 233; the heat-insulative lining 32 is covered on the tray body 30) to prevent quick loss of heat energy and to protect nearby electronic component parts. The pressure regulator 100 controls the exhaust of steam from the steam tube 122. When the pressure regulator 100 is controlled to close the bottom exhaust port 123, the top exhaust port 120 will be forced to open by steam, permitting steam to escape out of the cover 1 when the inside pressure of the cooking container 40 surpasses a predetermined level (see FIG. 8B). On the contrary, when the bottom exhaust port 123 is opened, steam is allowed to pass from the cooking container 40 to the space between the outer cover shell 10 and the inner cover plate 12 (see FIG. 8A), and then to pass through the air vents 129 and the water filter 201 into the steam tubes 21 (see FIG. 7) and the inside of the tray body 30 of the steam tray assembly 3. Two handles 11 are made on the outside of the casing 20 of the cooker unit 2 so that the electric cooker can be conveniently carried with the hands. There is also provided a rack 7 which can be put in the cooking container 40 to hold food for cooking so that cooked food is prohibited from been stuck on the inside wall of the cooking container 40. Furthermore, because the tray body 30 has a plurality of horizontal ribs 300 raised around the inside wall for holding the meshed steam rack 6, food can be put on the meshed steam rack 6 for cooking (see FIGS. 9A and 9B). Therefore, cooked food will not be stuck on the inside wall of the tray body 30.

While only one embodiment of the present invention has been shown and described, it will be understood that various modifications and changes could be made without departing from the spirit and scope of the invention disclosed.

I claim:

1. An electric cooker comprising:

a cooker unit, said cooker unit comprising a casing with a top, a hollow heat-conductive inner wall disposed inside said casing and covered with a heat-insulative lining, an electric heating coil horizontally disposed inside said casing below said hollow heat-conductive inner wall, a cooking container mounted within said hollow heat-conductive inner wall, a plurality of steam tubes mounted between said heat-insulative lining and said casing, a top water groove located between said casing and said heat-conductive inner wall and provided with a water filter, a water trough arranged on said top of said casing, a heat-conductive cover lining spaced below said electric heating coil and defining a bottom space in communication with said steam tubes, and a switch box on the outside of said casing for controlling the operation of said electric heating coil;

a steam tray assembly mounted in the bottom space of said cooker unit to hold food for steaming; and having a meshed steam rack on the inside for carrying food; and a cover hinged to said cooker unit and covered on said casing.

2. The electric cooker of claim 1 further comprising a pressure regulator controlled for allowing steam to be exhausted out of said cover or guided into said steam tray assembly through said steam tubes, said pressure regulator comprising a top exhaust port disposed outside said cover, a bottom exhaust port disposed inside said cover, a valve forced downwards by a spring between said top exhaust port and said bottom exhaust port.

3. The electric cooker of claim 1 wherein said electric heating coil has a profile fitting the profile of said cooker unit.

4. The electric cooker of claim 1 further comprising a cover lining control spring mounted inside said cooker unit to force said heat-conductive cover lining downwards.

5. The electric cooker of claim 1 wherein said water filter is connected to said steam tubes at the top.

6. The electric cooker of claim 1 wherein said steam tubes are respectively connected to the bottom space of said cooker unit by respective steam hoses for guiding steam from said cooking container to said steam tray assembly.

7. The electric cooker of claim 1 wherein said steam tray assembly comprises a tray body has a plurality of horizontal ribs at different elevations, and a meshed steam rack mounted on said horizontal ribs for holding food.

8. The electric cooker of claim 1 further comprises an elevation-adjustable rack for mounting in said food container for holding food.

* * * * *